Dec. 16, 1969  W. F. SMITH  3,484,507
PROCESS OF BLENDING THERMOPLASTIC POLYMERS WITH BITUMENS
Filed Dec. 28, 1964
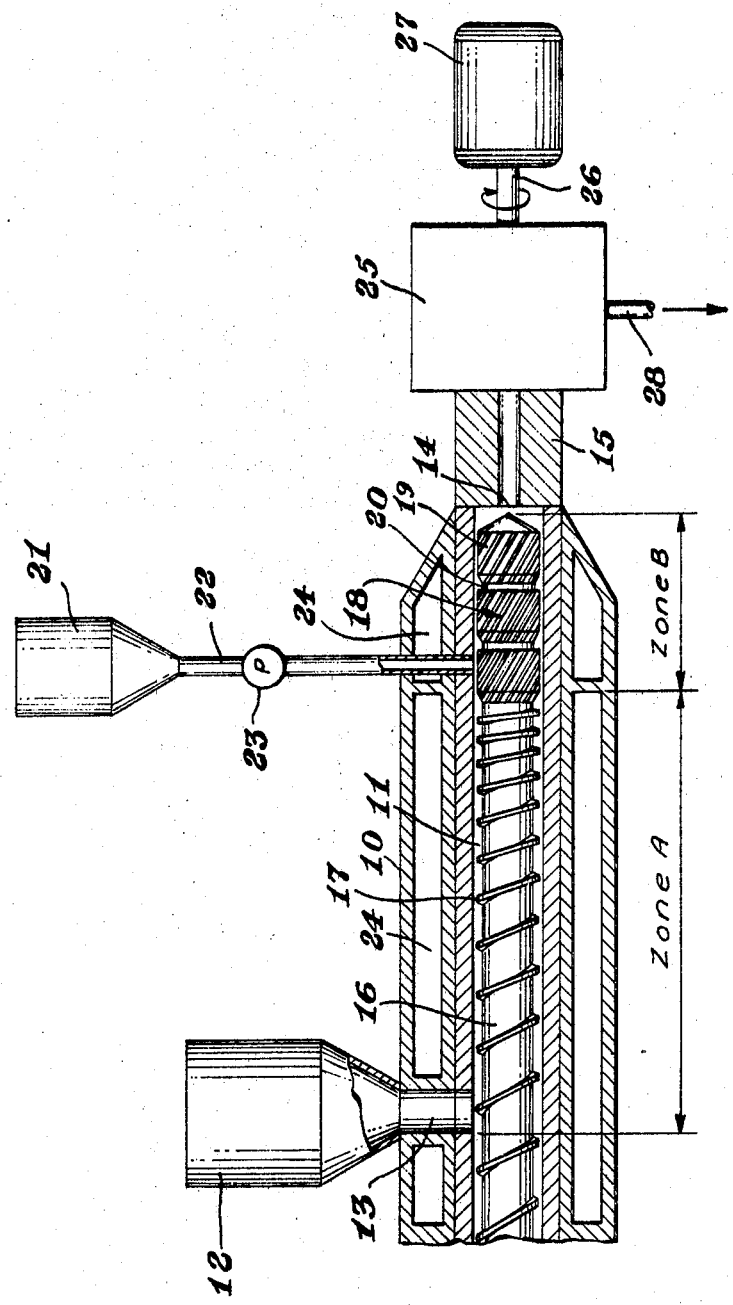
INVENTOR.
William F. Smith
BY Jerome Rudy
ATTORNEY

United States Patent Office 3,484,507
Patented Dec. 16, 1969

3,484,507
PROCESS OF BLENDING THERMOPLASTIC POLYMERS WITH BITUMENS
William F. Smith, Lake Jackson, Tex., assignor to The Dow Chemical Company, Midland, Mich., a corporation of Delaware
Filed Dec. 28, 1964, Ser. No. 421,552
Int. Cl. B29f 3/02
U.S. Cl. 264—40
4 Claims

ABSTRACT OF THE DISCLOSURE

A process is disclosed for preparing a homogeneous blend of polymers and copolymers of olefinically unsaturated aliphatic hydrocarbons with a bitumen which comprises feeding the polymer into the metering and pumping zone of a multizone extruder, feeding molten bitumen into the mixing zone of the extruder, metering and pumping the polymer at such a rate that the pressure developed in the metering pumping zone is greater than the pressure developed by the bitumen in the mixing zone of the extruder, mixing the polymer and bitumen in the mixing zone and then discharging the blend from the extruder and mixing the blend while maintaining the temperature at about 75° to 200° C. The apparatus whereby the foregoing process is performed is also disclosed.

---

This invention relates to an improved method for preparing blends of organic thermoplastic polymers and copolymers with bitumens.

It is well known in the art that the incorporation of certain waxes such as mineral waxes into thermoplastic polymeric compounds such as polyethylene, polypropylene and polybutylene and copolymers such as ethylene/ethyl acrylate, ethylene/vinyl acetate imparts improved properties to the polymer and results in a blend having desirable properties. It is also known to the art to incorporate organic thermoplastic polymers into asphalt to improve the physical properties of the asphalt. Homogeneous mixtures or blends of mineral waxes with thermoplastic polymers have found wide application in laminating or water-proofing of paper, cardboard, metal foil, fiber, textiles and sheeting of various types. Homogeneous mixtures of organic thermoplastic polymers with asphalt have found wide utility as roofing materials, sealants for pipe joints and water repellant metal coating compounds.

Various means have been used to blend polymeric hydrocarbons with bitumens such as mineral waxes and asphalts. This has often required the use of a plurality of machines such as dry mixers, compounding rolls, various types of kneaders or masticators or other diverse machines. This is costly and time consuming, and each handling of the material increases the chances of contamination and degradation of the product. To overcome this problem, various attempts have been made to effect the mixing and homogenizing in the extrusion device for shaping the blends into useful articles. However, it has been found that when such an apparatus is employed in the mixing operation the mineral wax or asphalt tends to make the surface of the extruder so slippery that uneven extrusion, and in some instances no mixing at all, is realized. For example, when a dry blend of a thermoplastic polymeric compound such as polyethylene and a mineral wax are prepared and fed to the extruder, the wax generally melts first and coats the granules of the polyethylene. The molten wax coating then functions as a lubricant and the extruder screw will not move or otherwise feed the polymer due to slippage caused by the lubricity imparted by the wax.

Melting the polymeric compound by increasing the temperature fails to reduce the lubricant action of the mineral wax or asphalt to any great degree, since the lubricity is first imparted by these materials which melt first due to their lower melting points. The slippage effect is further accentuated and increased when the thermoplastic polymeric compound and the mineral wax or asphalt have widely different viscosities in the molten state. Blending of such substances of widely divergent molten viscosities produces incompatible blends and correspondingly undesirably low physical properties.

In accordance with the present invention, the difficulties encountered in the prior art in mixing thermoplastic polymers with bitumens such as waxes and asphalts are substantially eliminated by a process which comprises feeding the thermoplastic polymer into a multizone extruder having, in sequence, a zone for melting, pumping and metering the polymer, a mixing zone and a discharge zone, melting, pumping and metering the polymer and continuously passing it to the mixing zone, feeding the bitumen into the mixing zone of the extruder by any suitable means, the metering and pumping of the polymer being at suih a rate that the pressure developed in the zone for melting, pumping and metering the polymer is greater than the pressure developed by the bitumen in the mixing zone of the extruder, admixing the polymer and bitumen in the mixing zone, passing the resulting homogenous blend to a temperature controlled mixer and further mixing the blend while maintaining the temperature at about 75° to about 200° C.

Bitumen as the word is used herein refers to native asphalt-like solid or semi-solid hydrocarbons including asphalt, asphaltites, asphaltic pyrobitumens and mineral, natural and synthetic waxes.

When operating according to the practice of the present invention, the thermoplastic polymer melts alone in the metering pumping zone of the extruder and is compressed and forced forward by the operation of the screw into the mixing zone of the extruder wherein the thermoplastic polymer is blended with the molten bitumen, e.g. mineral wax or asphalt. The molten thermoplastic polymer serves as an interfacial seal between the two molten layers in the separate zones of the extruder and thereby prevents the molten bitumen from entering the metering pumping section of the extruder and intermixing with and coating the thermoplastic polymer. In order for this interfacial seal to form, the metering zone of the extruder must be at least 2 pitch in length, and preferably 4 or more pitch in length.

It is important that care be exercised in order that the pressure exerted by the wax or asphalt in the mixing section of the extruder does not exceed the pressure built up in the thermoplastic polymer melt in the metering pumping section of the extruder. If this condition is allowed to occur, the molten wax or asphalt will be forced into the metering pumping section thereby intermixing with the thermoplastic polymer, lubricating and causing the extruder screw to malfunction.

Conventional extruders usually consist of a heated metal cylinder containing a closely fitted rotatable helical screw. A multizone extruder, as the term is used herein, is an extruder apparatus comprising a hollow cylinder having axially spaced feed inlet and outlet openings for the materials fed to it and a rotatable multizone screw disposed within the cylinder and extending from the feed inlet to the outlet. The screw is divided into at least two zones including a metering pumping zone wherein the screw in the extruder cylinder is constructed of helical flights for compressing and conveying feed material forward and a mixing zone wherein a torpedo or other shaped coaxial extension of the screw forms a mixing head which promotes thorough blending and homogenizing, and discharges the blended material from the extruder. Illustrative examples of such multizone screws are the abruptly increasing root, or so-called "nylon" metering screw, and the diminishing pitch screw with a helically fluted torpedo, or so-called "Dulmage" screw described in U.S. 2,453,088.

The figure represents a schematic cross-sectional view of one form of an apparatus wherein the process of the present invention may be carried out. Referring now to the figure, the apparatus includes a housing 10, provided with a generally elongated cylindrical inner cavity 11 which is in communication with feed hopper 12 by means of an inlet opening 13 and with a discharge orifice 14 in an extruder die, shown generally at 15. A multizone helically threaded screw, shown generally at 16, is rotatably mounted within the cavity 11. The screw 16 is provided with two main zones or sections, denoted A and B. Zone A of the screw 16 represents the metering pumping zone of the screw. It may be provided with helical flights 17 which progress from the feed hopper opening 13 area of the screw through Zone A with a diminishing lead on successive flights of the screw. The flights 17 terminate at the end of Zone A of the screw 16 at which point the screw is provided with an elongated cylindrical torpedo 18 secured coaxially to the screw 16 and fitting rotatably within and occupying from about ¼ to ½ of the cavity 11. The torpedo 18 is provided with a plurality of equally spaced helical grooves 19 with rounded bottoms in its cylindrical surface. The torpedo 18 is also provided with a plurality of spaced neck-like circumferential constrictions 20 along the torpedo of the same depth as the helical grooves 19, the constrictions 20 representing abrupt decreases in diameter of the torpedo 18 at their feed ends and gradual returns to the original diameter at their discharge or forward ends, the combined capacities of the helical grooves 19 and circumferential constrictions 20 being at least as great as the delivery capacity of the screw 16. A more detailed description of the torpedo of the type above described may be found in U.S. 2,453,088. The area of the cavity 11 occupied by the Torpedo 18 defines Zone B of the screw 16 and represents the mixing zone of the screw 16.

The cavity 11 is also in communication with heated container 21 by means of conduit means 22, the conduit means 22 being provided to introduce bitumens heated to the molten state in container 21, to Zone B, at a point immediately adjacent to Zone A. Conduit means 22 is equipped to introduce the molten bitumen under pressure by any suitable pumping means 23, such as for example, a reciprocating pump, gear pump or other type of positive displacement pump.

The housing 10, is heated by steam in chambers 24 and the organic thermoplastic polymer in the form of granular particles is fed by gravity to screw 16 in Zone A from feed hopper 12. The screw 16 and its coaxial extension, torpedo 18, are set in motion by a motor-driven gear (not illustrated) in the conventional manner. The organic thermoplastic polymer is compressed and melted in the metering pumping zone and is advanced by the screw 16 toward the torpedo 18 in the mixing zone of the extruder where it is intermixed and blended with the molten bitumen. The molten mass of thermoplastic polymer and bitumen are thoroughly and homogeneously mixed by the torpedo 18. The homogenous blend is discharged through discharge orifice 14, which may be heated, into a temperature controlled mixing means 25. A shaft 26 provides rotational motion to an agitator (not shown) of the mixer 25, shaft being operatively connected to motor assembly 27. The temperature controlled mixing means 25 may be any mixer which will impart a strong shearing action to the polymer/bitumen blend and is advantageously a continuous mixer such as a screw extruder or a twin screw extruder. The polymer/bitumen blend is continually mixed in temperature controlled mixing means 25 at a temperature of about 75° to about 175° C. for a time sufficient to obtain proper cooling and intimate blending generally from about 1 to about 15 minutes, depending on the blend components. After a sufficient mixing time, the blend is removed from the temperature controlled mixing means as by extrusion or other suitable means through discharge port 28. The subsequent mixing at controlled temperatures is a critical and essential step of the present process, for if such controlled temperature mixing is not performed the resultant polymer blend is insufficiently mixed resulting in blends of poor uniformity and physical properties.

The temperature at which zones A and B are maintained will depend upon the blend composition being prepared. The pressure at which the bitumens are introduced into the extruder and the temperatures to which they are heated will be dependent upon the bitumen used and the pressure which is necessary to counterbalance the pressure produced by the metering of the thermoplastic polymer by the extruder screw.

These temperatures and pressures will also vary with the type and design of the extruder employed for the blending of the polymer with the wax or asphalt compositions.

The process and apparatus of the present invention are useful for blending various bitumens with a wide variety of thermoplastic polymeric compounds.

Mineral waxes which may be blended by the process and in the apparatus of the present invention include petroleum waxes of the paraffin and microcrystalline types and mixtures thereof. These waxes have melting points within the range of about 40° C. to about 90° C. and can contain small amounts of non-waxy material such as mineral oil up to about 10 percent by weight. Other waxes which may be beneficially incorporated in the blends of the present invention include natural waxes such as carnauba wax and low molecular weight polyethylene waxes containing minor proportions of mineral oils.

Asphalts which can be blended by the process and in the apparatus of the present invention are preferably the petroleum asphalts of the aromatic type as distinguished from the naphthenic type. Commercially available asphalts of the aforementioned kinds are available in penetration values ranging from about 5 to 300 or more.

Thermoplastic polymeric compounds which may be beneficially blended with bitumens by the process of the present invention include polymers and copolymers of olefinically unsaturated aliphatic hydrocarbons containing from 2 to 10 carbon atoms. Illustrative examples of such olefin hydrocarbons are ethylene, propylene, n-butylene, isobutylene, the pentenes, the hexenes and the like. Ordinarily, the olefinic hydrocarbons are of the monoolefinic type containing the unsaturated bond in the α-position. In addition, copolymers of the olefinically unsaturated hydrocarbons with copolymerizable compounds having reactive side groups such as copolymers of ethylene and vinyl salicylate and copolymers of the olefinically unsaturated hydrocarbons with acrylates such as copolymers of ethylene and methyl, ethyl or butyl acrylate, isobutyl acrylate, β-hydroxyethyl acrylate, β-hydroxyethyl methacrylate, β-hydroxypropyl acrylate or copolymers of ethylene and acrylic and methacrylic acids, may also be beneficially blended with bitumen by the process of the present invention.

The invention is illustrated by the following specific examples but is not intended to be limited thereto.

EXAMPLE I

A petroleum wax having a melting point of 65° C. was melted and the molten wax pumped at a rate of 10 pounds per hour and at a pressure of 1250 p.s.i. into the mixing zone of an extruder of the type described in U.S. 2,453,088. This zone of the extruder was heated to a temperature of 149° C. An ethylene/ethyl acrylate copolymer containing 20 percent ethyl acrylate and having a melt index of 2.0 decig./min. was fed at the rate of 42 pounds per hour to the metering pumping zone of the extruder having a longitudinal length of 10 pitch which was heated to a temperature of 120° C. The extruder screw, driven at a rate of 152 r.p.m., advanced the ethylene/ethyl acrylate copolymer feed to the mixing zone of the extruder where the copolymer was intimately and homogenously blended with the molten wax. The homogenous copolymer-wax blend was discharged through the heated orifice of the extruder at a temperature of 185° C. into a continuous mixer where the blend was mixed while being cooled to a temperature of 160° C. The continuous mixer was comprised of a jacketed, temperature controlled cylindrical barrel 30.5 inches long having an inside diameter of 3.6 inches. The barrel had disposed therein a generally cylindrical screw measuring 30 inches in length having a diameter of 3.5 inches. The screw had 8 threads equally spaced about the circumference and formed a helix angle of 35 degrees. The grooves in the screw had a semi-circular configuration and a 0.5 inch radius. The screw was rotated at 8.8 revolutions per minute. The above rates resulted in an inventory time of about 3 minutes in the continuous mixer whereupon the blend was discharged from the mixer at 350 p.s.i. pressure. At no time during the blending process was any difficulty encountered owing to slippage and the resultant mixture thereby obtained was a homogenous blend of copolymer and wax.

The resultant blend had the following physical and tensile properties:

Wax content, percent _____ 25
Melt index, decig./min. [1] _____ 27.7
Rigidity, p.s.i. [2] _____ $1.6 \times 10^4$
Ultimate tensile strength, p.s.i. [3] _____ 1365
Tensile yield strength, p.s.i. [4] _____ 1090
Elongation, percent [5] _____ 590

[1] Melt index was determined according to ASTM D-1238-52T.
[2] Rigidity was determined in accordance with ASTM D-747-61T.
[3] Ultimate tensile strength.
[4] Tensile yield strength.
[5] Elongation were determined by using die B of ASTM D-412-51T, annealing the specimens for 10 minutes in boiling distilled water and taking measurements at a cross-head speed of 10 inches per minute.

EXAMPLE II

A petroleum wax having a melting point of 65° C. was melted and the molten wax pumped at a rate of 8.3 pounds per hour and at a pressure of 2800 p.s.i. into the mixing zone of the extruder employed in Example 1. This zone of the extruder was heated to a temperature of 162° C. An ethylene/ethyl acrylate copolymer containing 30 percent ethyl acrylate and having a melt index of 0.56 decig./min. was fed at the rate of 41.5 pounds per hour to metering pumping zone of the extruder which was heated to a temperature of 107° C. The extruder screw driven at a rate of 155 revolutions per minuate advanced the ethylene/ethyl acrylate copolymer feed to the mixing zone of the extruder where the copolymer was intimately and homogenously blended with the molten wax. The homogenous copolymer-wax blend was discharged through the orifice of the extruder at a temperature of 200° C. into the continuous mixer of Example 1 where the blend was mixed while being cooled to a temperature of 167° C. and then discharged after mixing for 3 minutes at this temperature at 1000 p.s.i. pressure. At no time during the blending process was any difficulty encountered owing to slippage and the resultant mixture thereby obtained was a homogeneous blend of copolymer and wax.

The blend had the following physical and tensile properties:

Wax content, percent _____ 19
Melt index, decig./min. _____ 4.7
Rigidity, p.s.i. _____ $0.83 \times 10^4$
Ultimate tensile yield strength, p.s.i. _____ 2350
Tensile yield strength, p.s.i. _____ 775
Elongation, percent _____ 755

The copolymer-wax blends obtained were so homogenous that it was virtually impossible from an examination of the product to determine that any substantial amount of wax had been added to the ethylene/ethyl acrylate copolymer. In fact, the copolymer-wax blend could be mixed with an additional amount of wax in the extruder without imparting any slippage difficulties during the blending process. The copolymer-wax blend of Example 2 when mixed with an additional quantity of wax according to the procedure of Example 2 had the following physical and tensile properties:

Wax content, percent _____ 36.5
Melt index, decig./min. _____ 34.6
Rigidity, p.s.i. _____ $1.5 \times 10^4$
Ultimate tensile strength, p.s.i. _____ 1785
Tensile yield strength, p.s.i. _____ 900
Elongation, percent _____ 700

EXAMPLE III

An aromatic asphalt having a penetration of 65 was pumped at a rate of 33.6 lbs./hr. at a pressure of 150 p.s.i. into the mixing zone of the extruder employed in Example 1. This zone of the extruder was heated to a temperature of 180° C. An ethylene/ethyl acrylate copolymer containing 30% ethyl acrylate and having a melt index of 20 decig./min. was fed at the rate of 10 lbs./hr. to the metering pumping zone of the extruder which was heated to a temperature of 180° C. The extruder screw, driven at a rate of 50 r.p.m., advanced the copolymer feed to the mixing zone of the extruder where the copolymer was intimately and homogeneously blended with the molten asphalt. The homogeneous copolymer-asphalt blend was discharged through the orifice of the extruder at a temperature of 180° C. into the continuous mixer of Example 1 where the blend was mixed and, while being cooled to a temperature of 120° C., was discharged after about 9 minutes at 150 p.s.i. pressure. At no time during the blending process was any difficulty encountered owing to slippage and the resultant mixture thereby obtained was a homogeneous blend of copolymer and asphalt. In conventional runs, i.e., where the asphalt and polymer are both added to the metering pumping zone and extruded the product extrudes, when extrusion is accomplished, as a watery lumpy mixture which solidifies to a conglomerate.

The copolymer-asphalt blend had the following properties:

Asphalt content, percent _____ 77
Viscosity at 165° C., cps. _____ 24,000
Penetration _____ 65

EXAMPLE IV

An aromatic asphalt, and having a penetration grade of 195, viscosity at 165° C. of 60 cps. was pumped at a rate of 8 lb./hr. at a pressure of 1500 p.s.i. into the mixing zone of the extruder employed in Example 1. This zone of the extruder was heated to a temperature of 175° C. An ethylene/ethyl acrylate copolymer containing 20 percent ethyl acrylate and having a melt index of 3 decig./min. was fed at the rate of 20.9 lb./hr. to the metering pumping zone of the extruder which was heated to a temperature of 175° C. This copolymer also contained 5 percent carbon black. The extruder screw, driven at a rate of 100 r.p.m. advanced the copolymer feed to the mixing section of the extruder where the copolymer was intimately and homogeneously blended with the molten asphalt. The homogeneous copolymer-asphalt blend was discharged through the orifice of the extruder at a temperature of 175° C. into the continuous mixer of Example 1 where the blend was mixed and while being cooled to a temperature of 102° C., was discharged from the mixer at 1500 p.s.i. pressure. At no time during the blending process was any difficulty encountered owing to slippage and the resultant mixture thereby obtained was a homogeneous blend of copolymer and asphalt. The blend had an asphalt content of 28 percent and had the following tensile properties as determined by the test procedure of Example 1.

| °C. | Tensile, p.s.i. | Yield, p.s.i. | Elongation, percent | Tensile [1] impact, p.s.i. |
|---|---|---|---|---|
| −30 | 3,945 | 2,690 | 625 | 2,375 |
| 0 | 3,295 | (²) | 1,250 | 2,745 |
| 23 | 1,575 | (²) | 1,390 | 2,645 |

[1] Tensile impact was determined by ASTM D1822.
² Not determined.

In a manner similar to that described above, homogenous thermoplastic polymer-bitumen blends may be prepared by mixing, in a multizone extrusion apparatus without incurring slippage difficulties, the thermoplastic polymers and copolymers mentioned above such as polyethylene, polypropylene, ethylene/vinyl acetate copolymers, and the like with the bitumens mentioned above.

What is claimed is:

1. A process for preparing a homogenous, intimate mixture of polymers and copolymers of olefinically unsaturated aliphatic hydrocarbons with a bitumen which comprises the steps of
   (a) feeding the olefinic hydrocarbon polymer into a multizone extruder having, in sequence, a zone for melting, pumping and metering the polymer, a mixing zone and discharge zone,
   (b) melting, pumping and metering the polymer and continuously passing it to the mixing zone,
   (c) feeding the bitumen in a molten state into the mixing zone of the extruder, the metering and pumping of the polymer being at such a rate that the pressure developed in the zone for melting, pumping and metering the polymer is greater than the pressure developed by the bitumen in the mixing zone of the extruder,
   (d) mixing and homogenizing the bitumen and polymer in the mixing zone of said extruder and then
   (e) discharging the homogenous blend from the extruder and mixing the blend while maintaining the temperature at about 75° to about 200° C.

2. The process of claim 1 wherein the olefinic hydrocarbon polymer is an ethylene/ethyl acrylate copolymer.

3. The process of claim 1 wherein the bitumen is a mineral wax having a melting point of 40° C. to 90° C.

4. The process of claim 1 wherein the bitumen is an aromatic asphalt having a penetration between 60 and 200.

References Cited

UNITED STATES PATENTS

| 2,298,846 | 10/1942 | Skooglund | 264—176 |
| 2,669,751 | 2/1954 | McCurdy et al. | 264—53 |
| 3,151,192 | 9/1964 | Jacobs et al. | 264—53 |
| 3,336,252 | 8/1967 | Raichle et al. | 264—171 |

FOREIGN PATENTS 593,588   3/1960   Canada.

DONALD J. ARNOLD, Primary Examiner

U.S. Cl. X.R.

18—1, 2; 264—148, 176